Patented May 24, 1938

2,118,664

UNITED STATES PATENT OFFICE 2,118,664

CELLULOSE ETHER PURIFICATION

Russell R. Bradshaw, Midland, Mich., assignor to The Dow Chemical Company, Midland, Mich., a corporation of Michigan No Drawing. Application January 7, 1937,
Serial No. 119,523

6 Claims. (Cl. 260—152)

This invention relates to an improved process for the purification of cellulose ethers.

An object of the invention is to provide a method whereby partially etherified cellulose fibers, inorganic salts, and other dissolved, occluded, or combined impurities may be removed from crude cellulose ethers. Another object of the invention is to provide a method whereby pure cellulose ethers capable of forming substantially colorless solutions and clear, haze-free films may be prepared from crude cellulose ethers. A particular object of the invention is to provide a process whereby pure ethyl cellulose, capable of forming substantially colorless solutions and clear, haze-free films, may be prepared from crude ethyl cellulose.

When cellulose ethers are prepared according to any of the known procedures, the crude product obtained from the etherification step, if dissolved in the usual solvents for such ethers, forms a solution which frequently displays an undesirable color and a marked turbidity. The presence of insufficiently etherified material is evidenced by cloudy or murky suspensions which are ordinarily very difficult to clarify. Crude cellulose ethers on being discharged from the etherifying apparatus frequently carry compounds of iron, nickel, copper, or other heavy metals intimately mixed with the ether itself. When such products are dissolved and the solvent subsequently evaporated to produce a film of the ether, these dissolved, occluded, and combined impurities impart a haze to the resulting film. Many of the known methods of purification of these and similar materials result in partial degradation of the ether, and in a material change in the viscosity thereof. It is frequently difficult to control the purification in such a manner that a product capable of producing a solution of any predetermined viscosity can be obtained.

It has been found that cellulose ethers having a predetermined viscosity can be formed by the etherification of specially treated alpha-cellulose. In the purification of such ethers, it is unnecessary and undesirable to use a process which will result in any material degradation of the ether. I am, therefore, concerned primarily with a process for the purification of crude cellulose ethers which yields a purified product having substantially the same viscosity as the crude etherified product.

I have now found that crude ethyl cellulose in solution in alcohol, carbon tetrachloride, or any of the usual solvents for this material, may be simply and effectively purified to such an extent that the resulting ethyl cellulose, when redissolved, forms a clear, transparent, substantially colorless solution, capable of laying down a clear, haze-free film of good tensile strength. According to my invention this purification is accomplished through the employment of a suitable aliphatic carboxylic acid. Examples of such acids which are satisfactory in the herein described process are formic acid, acetic acid, chloro-acetic acid, oxalic acid, propionic acid, lactic acid, malonic acid, tartronic acid, succinic acid, tartaric acid, and other acids of similar chemical structure. The term "aliphatic carboxylic acid" is herein employed to designate compounds of the type illustrated by the foregoing examples, but does not include compounds containing substituents reactive with the cellulose ether or solvent therefor, nor does it include acids having the aldehyde group as a substituent, e. g. glyoxylic acid. In a preferred method of carrying out the invention, crude ethyl cellulose is mixed with a solvent therefor, and an aliphatic carboxylic acid is added thereto. Such mixture is then agitated and filtered to remove suspended materials which are made readily filterable by the addition of said acid reagent. The solution of ethyl cellulose is then mixed with water maintained at a temperature above the boiling point of the solvent employed to flash off the solvent and precipitate the ethyl cellulose. The precipitate is washed with water until free from acid, and is thereafter dried. The acid reagent employed in excess of the amount required may be recovered from the aqueous solution remaining after precipitation of the cellulose ether mixture, suitably by distillation, as in the case of readily volatile acids such as formic acid or acetic acid, or by crystallization, in the case of oxalic, tartaric or other solid acids.

As an alternative to the above outlined procedure, it has been found satisfactory after mixing the solution of untreated cellulose ether with an aliphatic carboxylic acid and agitating the same, to neutralize the solution with a suitable alkali, e. g. sodium hydroxide, and to remove alkali aliphatic carboxylates from the solution, together with suspended impurities, in the filtration step referred to above.

The acid reagent used may be employed in any desired dilution, but for convenience, and to avoid the possibility of prematurely precipitating ethyl cellulose, it is ordinarily employed in the form of a concentrated solution, and in an amount ordinarily in the range from about 0.25 part to about 2.5 parts by weight of acid per part of crude ethyl cellulose. Aqueous formic acid is commercially available in concentrations up to 85 per cent, and is soluble in ethyl alcohol in all proportions. Acetic acid may be employed in the form of moderately concentrated solutions or as glacial acetic acid having a purity of approximately 98%-100%. This material is miscible with all of the common solvents for cellulose ethers. Oxalic acid is ordinarily a solid which, in the form of its dihydrate, dissolves in alcohol only to the extent of 23.7 grams per hundred c. c. of alcohol. When oxalic or other solid acids are used, they may be added in solid form to the solution of ethyl cellulose, the agitation employed during the purification being ordinarily sufficient to dissolve the acid and to produce intimate contact between said acid and the dissolved ethyl cellulose.

For purposes of comparison between solutions of ethyl cellulose, I have established a series of arbitrary color standards, wherein the numeral 1 serves to designate a water-white solution and succeeding numbers refer to solutions having color in increasing intensity, the number 10 indicating a solution having a very pale yellow-brown or yellow-green coloration similar in intensity to the lower end of the standard "caramel" color scale used by lacquer manufacturers. Numerals from 1 to 5 designate the color characteristics of solutions which will give films entirely satisfactory for most industrial applications, while the numerals 1 to 3 refer to solutions meeting the requirements of the most particular applications. The cellulose ether solutions used for the determination of color and of viscosity characteristics, and hereinafter referred to as "standard solutions", were invariably prepared as follows: The cellulose ether was dissolved to the extent of 5 per cent by weight in a mixture of 33 parts by volume of methyl alcohol and 67 parts by volume of benzene.

The following examples illustrate various ways of practicing my invention:

Example 1

Crude ethyl cellulose, whose standard solution had a viscosity of 19 centipoises, a color of 6+, and which was characterized by forming a hazy film, was dissolved in 95 per cent ethyl alcohol to form a 10 per cent solution by weight and was treated with 1.35 parts of formic acid in an 85 per cent solution thereof per part of crude ethyl cellulose. The resulting mixture was agitated at ordinary room temperature for about 10 minutes. Suspended matter was removed by filtration and the clear filtrate was run slowly into a volume of boiling water approximately double that of the alcohol solution. The alcohol was flashed off as vapor, which was condensed and recovered. The ethyl cellulose was precipitated immediately upon contact with the boiling water. It was subsequently washed with large volumes of hot distilled water, filtered to remove as much water as possible, and dried. A standard solution of the purified product displayed a color designated by the numeral 5, a viscosity of 19 centipoises, and resulted in the formation of an almost clear film having a tensile strength equal to that of the film produced from the crude ethyl cellulose.

Example 2

In a manner similar to that described in Example 1 a crude ethyl cellulose, whose standard solution exhibited a color of 6+ and a viscosity of 35 centipoises, was treated in alcoholic solution with 1.35 parts of formic acid in an 85 per cent solution thereof per part of crude ethyl cellulose. A standard solution of the purified material exhibited a color of 3+, had a viscosity of 29 centipoises, and produced a film which was nearly clear.

Example 3

Crude ethyl cellulose whose standard solution had a color of 6+ and a viscosity of 19 centipoises, and which produced a very hazy film, was treated in alcohol solution with 0.66 part of 85 per cent formic acid per part of crude ethyl cellulose in a manner analogous to that described above. The resulting purified ethyl cellulose formed a standard solution which had a color of 4, a viscosity of 19 centipoises, and resulted in the formation of a film which was nearly clear and whose tensile strength was substantially the same as that of a film produced from the crude ethyl cellulose.

Example 4

A crude ethyl cellulose, whose standard solution had a color of 7-G, wherein G designated the existence of a slight green tinge, and a viscosity of 21 centipoises, was dissolved in 95 per cent ethyl alcohol. This solution was treated with 0.725 part of crystalline oxalic acid per part of crude ethyl cellulose. This solution was boiled for 10 minutes to dissolve the oxalic acid and to intermix thoroughly the ethyl cellulose and the acid reagent. This solution was then filtered to remove suspended matter and was gradually added to boiling water in a manner similar to that described in Example 1. The precipitated ethyl cellulose, when dried and dissolved in a mixture of methyl alcohol and benzene, in the form of a standard solution, exhibited a color of 4-G+, and had a viscosity of 20 centipoises. The film prepared from this standard solution exhibited a very slight haze but was satisfactory for use in most commercial applications of ethyl cellulose.

Example 5

A crude ethyl cellulose whose standard solution had a color of 7, and a viscosity of 19 centipoises was dissolved in 95% ethyl alcohol to form a 10% solution therein. This solution was treated with 0.8 part of glacial acetic acid per part of crude ethyl cellulose. The solution was agitated for a short time at room temperature and was then filtered to remove suspended matter. The clear filtrate was gradually added to water and the temperature elevated to above 80° C. The alcohol was distilled off and recovered. The precipitated ethyl cellulose was washed and dried. A standard solution of this purified product exhibited a color of 5+ and had a viscosity of 19 centipoises. The film prepared from this standard solution was almost clear and was characterized by a tensile strength equal to that of films produced from the untreated crude ethyl cellulose.

Various modifications of the foregoing procedure have likewise been found satisfactory. For example, the desired amount of acid reagent may be dissolved in sufficient alcohol to dissolve the batch of ethyl cellulose to be purified. This acid-alcohol mixture may be placed in a suitable container and the crude ethyl cellulose discharged directly thereinto from the reaction vessel in which ethylation occurred. The resulting solution may be agitated, filtered, and subsequently treated as described in the foregoing examples.

The clear filtrate may be mixed with water to precipitate the purified cellulose ether, and the solvent subsequently recovered by distillation.

Solvents for ethyl cellulose other than ethyl alcohol may be used. For example, methyl and propyl alcohols or mixtures of these with ethyl alcohol; the aromatic hydrocarbons, such as benzene, toluene, xylene, or the mono- and dichloro derivatives thereof; the chlorinated aliphatic hydrocarbons, such as chloroform, propylene chloride and the like; ketones, such as acetone, methyl ethyl ketone; the alkyl ethers, such as ethyl or isopropyl ethers; and the esters, such as ethyl acetate, butyl acetate, and the like; or mixtures of any of the foregoing, particularly those comprising an aliphatic alcohol. Any material which will dissolve cellulose ethers and which is miscible with, or a solvent for, aliphatic carboxylic acids or alcoholic solution of these acids and whose boiling point is not substantially higher than that of water, is satisfactory.

The amount of acid reagent used in the purification process may vary widely from run to run, depending entirely upon the amount of impurities present in the crude product. Although I have ordinarily used amounts of acid ranging from about 0.25 part to about 2.5 parts per part of ethyl cellulose being treated, and usually in the form of saturated aqueous or alcoholic solutions, lesser or greater amounts and other solvents may be employed as required.

Except for the step of recovering the solvent and precipitating the purified ethyl cellulose, which is carried out at or near the boiling point of water, all of the steps of the herein-described process are suitably carried out at room temperature, but higher temperatures, up to the boiling point of the solvent, may also be used.

My process may be applied to the treatment of methyl, ethyl, propyl, butyl, ethyl propyl, ethyl benzyl, or other lower alkyl or mixed alkyl-aralkyl ethers of cellulose.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a process for the purification of crude cellulose ether, the steps which consist in mixing the same in a substantially non-aqueous solvent therefor which is non-reactive with the cellulose ether, with between about 0.25 part and about 2.5 parts by weight of an aliphatic carboxylic acid per part of the cellulose ether, thereafter removing filterable impurities from the solution, contacting the solution with water maintained at a temperature above the boiling point of the substantially non-aqueous solvent, thereby flashing off the solvent and precipitating the cellulose ether, and recovering the cellulose ether so precipitated, which has substantially the same viscosity characteristics as those of the crude ether prior to said treatment.

2. In a process for the purification of crude ethyl cellulose, the steps which consist in mixing an alcoholic solution of the same with between about 0.25 part and about 2.5 parts of an aliphatic carboxylic acid, per part of ethyl cellulose, thereafter removing filterable impurities from the solution, contacting the solution with water at a temperature maintained above the boiling point of the alcohol, thereby flashing off the alcohol and precipitating the ethyl cellulose, and recovering ethyl cellulose so precipitated, which has substantially the same viscosity characteristics as those of the crude ether prior to said treatment.

3. In a process for the purification of crude ethyl cellulose, the steps which consist in mixing the same in a substantially non-aqueous solvent therefor which is non-reactive with the cellulose ether, with oxalic acid in an amount between about 0.25 part and about 2.5 parts per part of ethyl cellulose, agitating the resulting mixture, removing filterable impurities therefrom, contacting the remaining solution with boiling water, thereby flashing off the solvent and precipitating the cellulose ether, and recovering the cellulose ether so precipitated, which has substantially the same viscosity characteristics as those of the crude ether prior to said treatment.

4. In a process for the purification of crude ethyl cellulose without materially altering the viscosity of the solutions formed therefrom, the steps which consist in treating an alcoholic solution thereof with an amount of formic acid equivalent to between about 0.25 part and about 2.5 parts per part of ethyl cellulose, agitating the resulting acid mixture, filtering to remove suspended matter, contacting the remaining solution with boiling water, thereby flashing off the alcohol and precipitating ethyl cellulose, washing and drying said precipitated ethyl cellulose and recovering the same in substantially pure form, characterized by having a viscosity substantially the same as that of the crude ether prior to said treatment.

5. In a process for the purification of crude ethyl cellulose, the steps which consist in mixing an alcoholic solution thereof with an amount of 85 per cent formic acid equivalent to between about 0.25 part and about 2.5 parts per part of ethyl cellulose, thereafter removing filterable impurities from the solution, contacting the clarified solution with water maintained at a temperature above the boiling point of the alcohol, thereby flashing off the alcohol and precipitating the ethyl cellulose, and recovering ethyl cellulose so precipitated, which has substantially the same viscosity characteristics as those of the crude ether prior to said treatment.

6. In a process for the purification of crude ethyl cellulose, the steps which consist in mixing the same in a substantially non-aqueous solvent therefor which is non-reactive with the cellulose ether, with acetic acid in an amount between about 0.25 part and about 2.5 parts per part of ethyl cellulose, thereafter removing filterable impurities from the solution, contacting the solution with water at a temperature maintained above the boiling point of the alcohol, thereby flashing off the alcohol and precipitating the ethyl cellulose, and recovering ethyl cellulose so precipitated.

RUSSELL R. BRADSHAW.